United States Patent
Manners

(10) Patent No.: US 7,216,674 B2
(45) Date of Patent: *May 15, 2007

(54) INSTALLATION ASSEMBLIES FOR PIPELINE LINERS, PIPELINE LINERS AND METHODS FOR INSTALLING THE SAME

(75) Inventor: Cameron Manners, Bowmanville (CA)

(73) Assignee: NuFlow Technologies (2000), Inc., Bowmanville, Ontario (CA)

( * ) Notice: Subject to any disclaimer, the term of this patent is extended or adjusted under 35 U.S.C. 154(b) by 105 days.

This patent is subject to a terminal disclaimer.

(21) Appl. No.: 10/491,760

(22) PCT Filed: Oct. 3, 2002

(86) PCT No.: PCT/CA02/01480

§ 371 (c)(1),
(2), (4) Date: Aug. 3, 2004

(87) PCT Pub. No.: WO03/031857

PCT Pub. Date: Apr. 17, 2003

(65) Prior Publication Data

US 2004/0258479 A1 Dec. 23, 2004

Related U.S. Application Data

(63) Continuation of application No. 09/972,184, filed on Oct. 5, 2001, now Pat. No. 6,691,741.

(51) Int. Cl.
*F16L 55/162* (2006.01)
*F16L 55/128* (2006.01)

(52) U.S. Cl. .......................... 138/98; 138/93

(58) Field of Classification Search ................. 138/93, 138/97, 98
See application file for complete search history.

(56) References Cited

U.S. PATENT DOCUMENTS

| | | |
|---|---|---|
| 3,914,825 A | 10/1975 | Reynolds |
| 4,029,428 A | 6/1977 | Levens |
| 4,167,358 A | 9/1979 | Besha |
| 4,207,130 A | 6/1980 | Barber |
| 4,245,970 A | 1/1981 | St. Onge |
| 4,351,349 A | 9/1982 | Minotti |
| 4,366,012 A | 12/1982 | Wood ..................... 156/93 |
| 4,778,553 A | 10/1988 | Wood |

(Continued)

FOREIGN PATENT DOCUMENTS

EP 0241719 10/1987

(Continued)

*Primary Examiner*—James Hook
(74) *Attorney, Agent, or Firm*—Baker & Daniels LLP

(57) ABSTRACT

An installation assembly (20) for installing a liner (L) in a pipeline (P) comprises a double bladder assembly (22) including an inner bladder (26) having an installation end (26b) and a retrieval end (26c). An outer bladder (28) surrounds the inner bladder. The ends of the inner and outer bladders are coupled together adjacent the installation end via an inversion element (30). The inner bladder is coupled to an air source at its retrieval end and the outer bladder adjacent the retrieval end is free. Following installation and curing of the liner, the bladder assembly is retrieved by pulling on the retrieval end of the inner bladder, and upon retrieval, the outer bladder is inverted.

22 Claims, 9 Drawing Sheets

U.S. PATENT DOCUMENTS

| | | |
|---|---|---|
| 5,044,405 A | 9/1991 | Driver et al. |
| 5,167,258 A | 12/1992 | Rice |
| 5,223,189 A | 6/1993 | Friedrich |
| 5,322,653 A | 6/1994 | Muller |
| 5,329,063 A | 7/1994 | Endoh |
| 5,354,586 A | 10/1994 | Yokoshima et al. |
| 5,501,248 A | 3/1996 | Kiest, Jr. |
| 5,628,345 A | 5/1997 | Fisco .................. 138/98 |
| 5,692,543 A | 12/1997 | Wood |
| 5,706,861 A | 1/1998 | Wood et al. |
| 5,765,597 A | 6/1998 | Kiest, Jr. et al. |
| 5,794,663 A | 8/1998 | Kiest, Jr. et al. |
| 5,855,729 A | 1/1999 | Kiest, Jr. et al. |
| 5,927,341 A | 7/1999 | Taylor |
| 5,950,682 A | 9/1999 | Kiest, Jr. |
| 5,964,249 A | 10/1999 | Kiest, Jr. |
| 6,019,136 A | 2/2000 | Walsh et al. |
| 6,021,815 A | 2/2000 | Kiest, Jr. et al. |
| 6,039,079 A | 3/2000 | Kiest, Jr. |
| 6,105,619 A | 8/2000 | Kiest, Jr. |
| 6,199,591 B1 * | 3/2001 | Kiest et al. ................ 138/98 |
| 6,206,993 B1 * | 3/2001 | Kiest et al. ............... 156/156 |
| 6,276,398 B1 | 8/2001 | Lange .................. 138/98 |
| 6,691,741 B2 | 2/2004 | Manners ................ 138/98 |
| 7,018,691 B2 * | 3/2006 | McNeil .............. 428/36.91 |
| 2002/0157784 A1 * | 10/2002 | Kiest, Jr. ............... 156/287 |

FOREIGN PATENT DOCUMENTS

| | | |
|---|---|---|
| EP | 0518521 | 12/1992 |
| EP | 0 789 179 A2 | 8/1997 |
| EP | 0 887 584 A1 | 12/1998 |
| WO | WO93/16320 | 8/1993 |
| WO | WO95/08737 | 3/1995 |

* cited by examiner

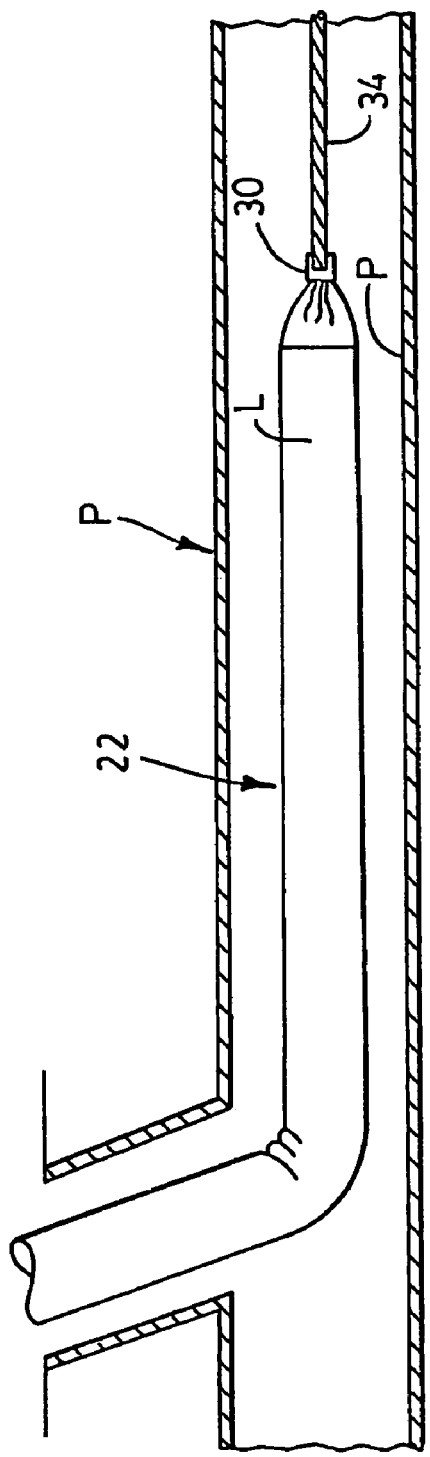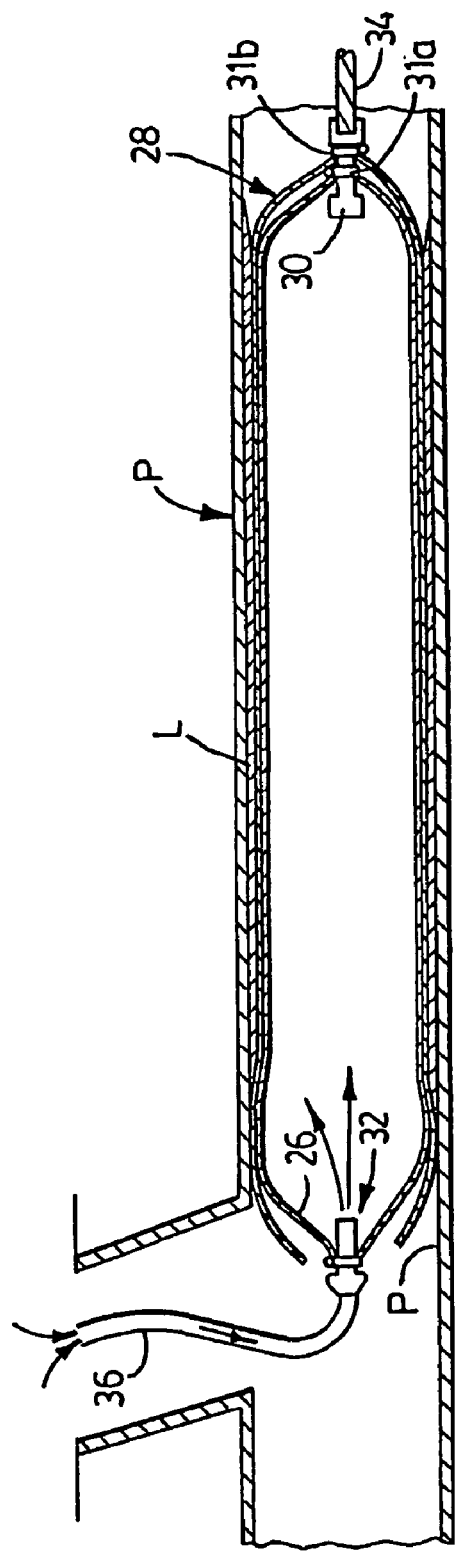

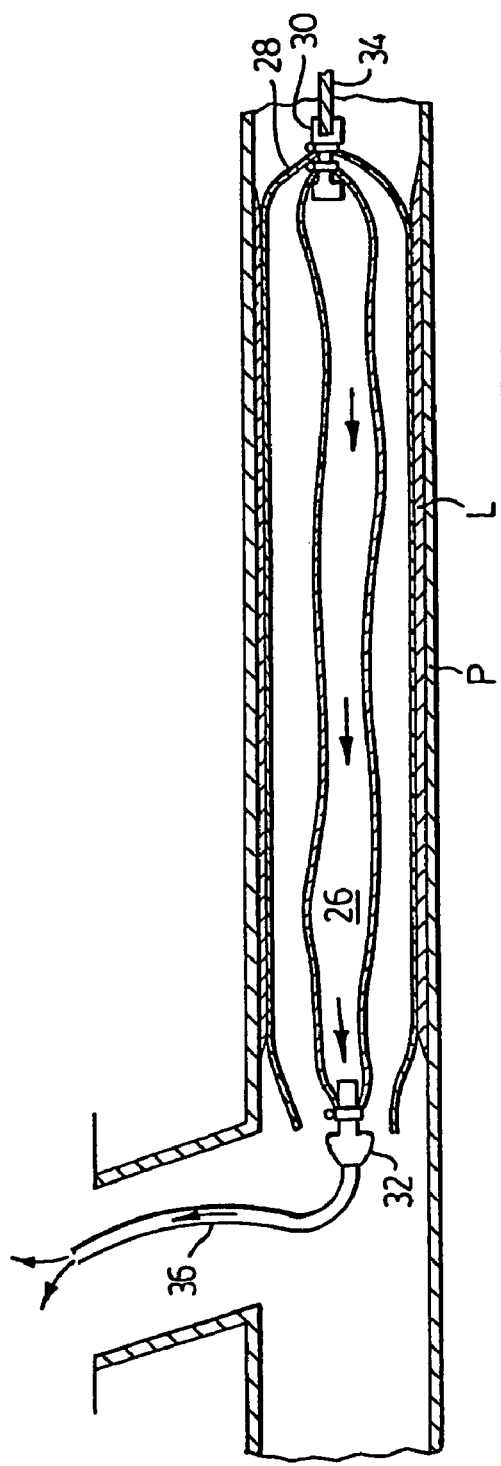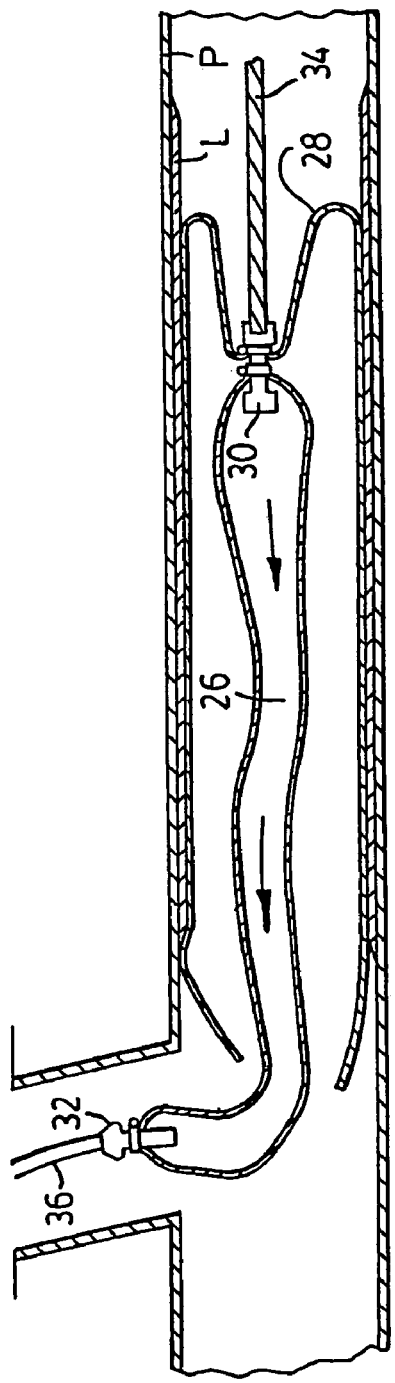
FIG.4
FIG.5

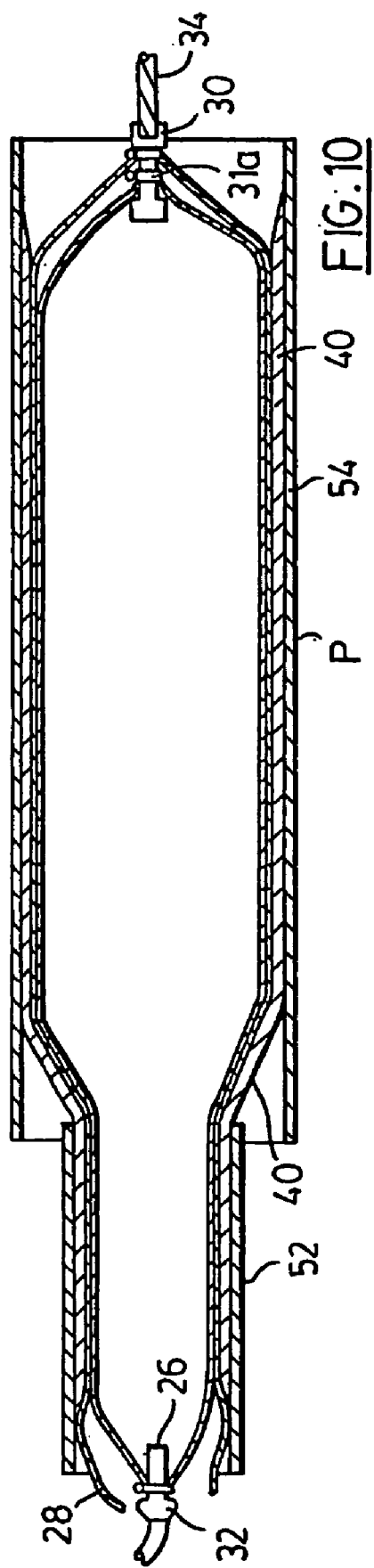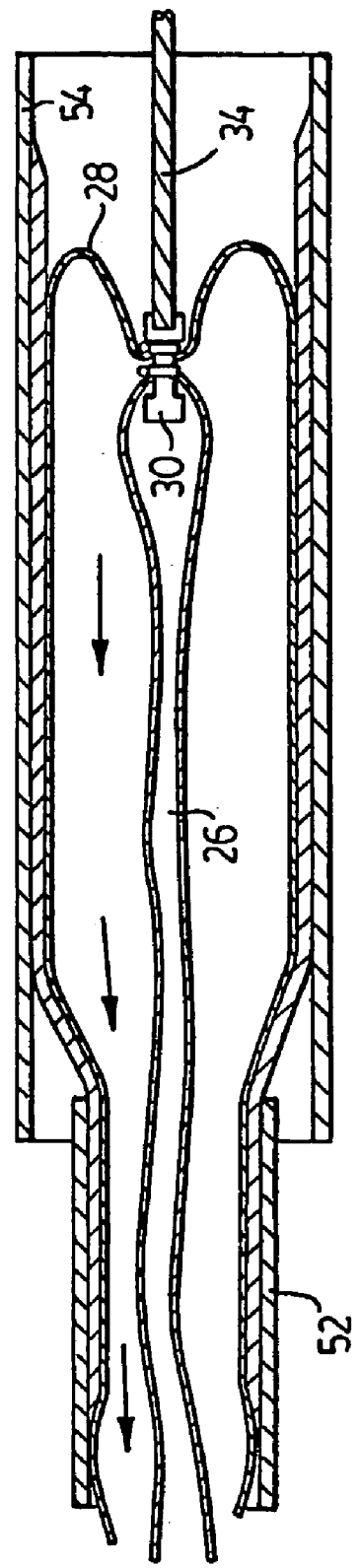

US 7,216,674 B2

INSTALLATION ASSEMBLIES FOR PIPELINE LINERS, PIPELINE LINERS AND METHODS FOR INSTALLING THE SAME

CROSS REFERENCE TO RELATED APPLICATIONS

This application is related to and claims the benefit under 35 U.S.C. §119 and 35 U.S.C. §365 of International Application No. PCT/CA02/01480, filed Oct. 3, 2002. This is a continuation of U.S. patent application Ser. No. 09/972,184 filed Oct. 5, 2001, now U.S. Pat. No. 6,691,741.

TECHNICAL FIELD

The present invention relates to pipeline repair and/or reinforcement and in particular to installation assemblies for pipeline liners, pipeline liners per se and methods for installing pipeline liners.

BACKGROUND ART

Pipeline liners are often used to repair and/or reinforce ruptured or weak areas in pipeline networks such as sewer systems and the like. There are many disadvantages associated with current methods of installing pipeline liners.

Pipeline liners for constant or variable diameter pipelines are typically installed using bladder systems. During installation of a pipeline liner, the bladder system is inflated to expand the pipeline liner and force it against the interior surface of the pipeline. The pipeline liner is then allowed to cure against the inner wall of the pipeline. Current bladder systems require pipeline access at the location that is to be repaired or re-enforced. Gaining access to a particular pipeline location can be difficult. Additional labor is required because the pipeline must be excavated in order to gain access at the desired location.

It is also not uncommon for a pipeline to vary in diameter along its length. Such an in-line transition in pipeline size has traditionally made it necessary for technicians to excavate at the transition point in order to install a pipeline liner. Although, expandable pipeline liner materials that accommodate the varying diameter of a pipeline are currently available, these materials become thinner when they expand to larger diameters. As a result larger diameter sections of pipelines end up with a sub standard repair because there is not enough pipeline liner material to give it strength.

Another difficult area of pipelines to repair or re-enforce is the T-junction between a main pipe to a lateral line. These junctions are typically the weakest joints in pipeline systems. Therefore, lining of these junctions is common. Current pipeline liners for T-junctions are difficult to install and require multiple steps, thus making the installation procedure time consuming for technicians. As will be appreciated, improvements to pipeline liner installation assemblies, pipeline liners and methods of installing the same are desired.

It is therefore an object of the present invention to obviate or mitigate at least one of the above described disadvantages.

DISCLOSURE OF THE INVENTION

According to one aspect of the present invention there is provided an installation assembly for installing a liner in a pipeline, said installation assembly comprising:

a bladder assembly to be inserted into a liner, said bladder assembly including:

an inflatable inner bladder having an installation end and a retrieval end and defining an internal reservoir; and an outer bladder surrounding said inner bladder at least along a portion of the length thereof, said outer bladder having an end coupled to said inner bladder adjacent said installation end;

a fluid passage coupled to said inner bladder, said fluid passage for introducing fluid into said internal reservoir to inflate said inner bladder and expand a liner carried by said bladder assembly so that said liner can be brought into firm contact with an interior surface of said pipeline; and a retrieval line for removing said bladder assembly from said pipeline, said retrieval line being coupled to the retrieval end of said inner bladder so that when said bladder assembly is removed from said liner with said inner bladder deflated, said outer bladder separates from said liner and inverts.

Preferably, the installation assembly further comprises an inversion element received by the inner bladder and the outer bladder adjacent the installation end. The inner and outer bladders are coupled to a portion of the inversion element. It is also preferred that the installation assembly further comprises an installation cable coupled to the inversion element external to the bladder assembly. The installation cable is used to pull the bladder assembly to a desired location within the pipeline.

In a preferred embodiment, the fluid passage is a hose coupled to the retrieval end of the inner bladder and constitutes the retrieval line. It is also preferred that the installation assembly further include an air pump coupled to the hose to inflate and evacuate the inner bladder.

According to another aspect of the present invention there is provided a bladder assembly for installing a liner within a pipeline comprising:

an elongate bladder defining an internal reservoir and having a leading end and a trailing end;

a valve element coupled to said elongate bladder to permit the ingress and degress of fluid into said bladder thereby to inflate and deflate said bladder; and a sleeve generally surrounding said bladder, said sleeve being coupled to said bladder adjacent said leading end.

According to yet another aspect of the present invention there is provided a method of installing a liner in a pipeline comprising the steps of:

pulling a bladder assembly carrying a wetted liner in one direction into position in said pipeline, said bladder assembly including an inner bladder having an installation end and a retrieval end and an outer bladder surrounding said inner bladder and contacting an inner surface of said liner, said outer bladder having one end coupled to said inner bladder adjacent said installation end and an opposite free end;

introducing fluid into said inner bladder to inflate said inner bladder so that said bladder assembly expands to bring said liner into firm contact with an interior surface of said pipeline.

maintaining said bladder assembly in an inflated condition for a time period sufficient for said liner to cure;

deflating said inner bladder; and retrieving said bladder assembly from said pipeline by pulling said bladder assembly in an opposite direction via said inner bladder so that when said inner bladder moves out of said liner, said outer bladder separates from said liner and inverts.

According to yet another aspect of the present invention there is provided a liner for a variable diameter pipeline comprising:

an expandable tube formed from a rolled sheet of flexible material and having an overlapping portion therein; and a web secured to said tube to maintain said tube in a rolled condition, said web defining an expandable joint running generally the length of said tube.

Preferably, the overlapping portion is sized to cover the web when the tube is in an expanded condition. It is also preferred that the web is formed of expandable material and extends between an edge of the tube and a main portion of the tube to trap the overlapping portion within the tube. According to still yet another aspect of the present invention there is provided an installation assembly for installing a liner at a junction between a main pipe and a lateral pipe, said installation assembly comprising:

an inflatable bladder assembly for carrying a liner, said bladder assembly including a main portion and a lateral portion and defining an internal reservoir, said lateral portion including an inner bladder and an outer bladder, said outer bladder extending at least along a portion of the length of said inner bladder, said outer bladder and inner bladder being coupled adjacent a distal end of said lateral portion; and a fluid passage coupled to said bladder assembly to introduce fluid into said internal reservoir and inflate the main and lateral portions of said bladder assembly thereby to expand said liner so that when said lateral portion extends into said lateral pipe and said main portion is in said main pipe, said liner is brought into contact with the interior of said main and lateral pipes and conforms to the shape of said junction.

Preferably, the lateral portion of the bladder system includes an inner bladder and an outer bladder. The outer bladder extends at least along a portion of the length of the inner bladder. The outer and inner bladders are coupled adjacent a distal end of the lateral portion. It is also preferred that a carder extends through the main portion of the bladder system. A second installation cable is coupled to a leading edge of the carrier and a retrieval carrier is coupled to a trailing edge of the carrier. It is also preferred that the fluid passage is in the form of a hose having one end received by the carrier.

According to still yet another aspect of the present invention there is a method of installing a liner having main and lateral portions at a junction between main and lateral pipes, said method comprising the steps of:

pulling a bladder assembly carrying a wetted liner into said pipeline, said bladder assembly including a main portion and a lateral portion and defining an internal reservoir, said bladder assembly being positioned so that the lateral portion thereof extends into said lateral pipe and with the main portion thereof positioned in said main pipe;

introducing fluid into said bladder assembly to inflate said bladder assembly so that said bladder assembly expands to bring said liner into firm contact with interior surfaces of the main and lateral pipes and conform said liner to the shape of said junction;

maintaining said bladder assembly in an inflated condition for a time period sufficient for said liner to cure;

deflating said bladder assembly; and retrieving said bladder assembly from said pipeline by pulling said bladder assembly from said liner.

The present invention provides advantages in that liners can be installed in pipelines in a relatively simple manner without requiring excavation to access the pipelines. The present invention also provides advantages in that liners can be installed at junctions between main and lateral pipes in a single application. The present invention provides further advantages in that variable diameter pipelines can be repaired and/or reinforced while ensuring high integrity linings.

BRIEF DESCRIPTION OF THE DRAWINGS

Embodiments of the present invention will now be described more fully with reference to the accompanying drawings in which:

FIG. 2 is a side elevational view, partly in section, of the installation assembly of FIG. 1 in a deflated condition being inserted into a pipeline and carrying a liner;

FIG. 3 is a side sectional view of the installation assembly of FIG. 1 in an inflated condition to install a liner in a pipeline;

FIG. 4 is a side sectional view of the installation assembly of FIG. 1 in a deflated condition prior to removal from a pipeline;

FIG. 5 is a side sectional view of the installation assembly of FIG. 1 during retrieval from a pipeline;

FIG. 10 is a side sectional view of the installation assembly of FIG. 1 in an inflated condition to install the liner of FIG. 6 in a variable diameter pipeline;

FIG. 13 is a side sectional view of the installation assembly of FIG. 1 during retrieval from a variable diameter pipeline;

BEST MODES FOR CARRYING OUT THE INVENTION

Figure 1:
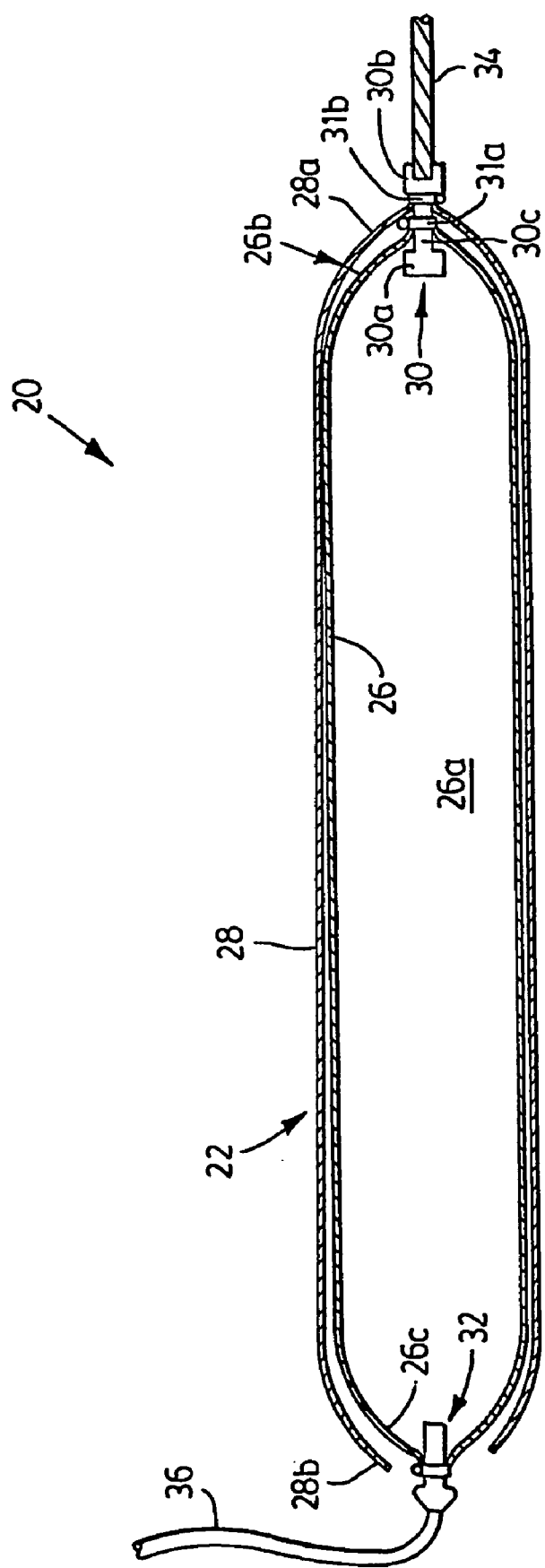
FIG. 1 is side sectional view of an installation assembly for installing a liner within a pipeline in accordance with the present invention.

Turning now to FIG. 1, an installation assembly for installing a liner within a pipeline in accordance with the present invention is shown and is generally identified by reference numeral 20. As can be seen, installation assembly 20 includes a double bladder assembly 22 comprising an inner bladder 26 defining an internal reservoir 26a and an outer bladder 28 surrounding the inner bladder 26. The inner bladder 26 is elongate and has a leading installation end 26b and a trailing retrieval end 26c. An inversion element 30 that is generally shaped like an I-section having a pair of blocks 30a and 30b joined by a bight 30c, is partially accommodated by the inner bladder 26. Specifically, the leading installation end 26b of the inner bladder 26 receives the block 30a and is secured to the bight 30c by a clamp 31a to seal the leading installation end 26b of the inner bladder. The trailing retrieval end 26c of the inner bladder accommodates a valve 32 to enable fluid to enter the internal reservoir 26a and inflate the inner bladder 26.

The outer bladder 28 surrounds the inner bladder 26 like a sleeve and has a leading end 28a that is secured to the bight 30c of the inversion element 30 by a second clamp 31b. Unlike the inner bladder 26, the trailing end 28b of the outer bladder 28 is open.

A winch cable 34 is coupled to block 30b of the inversion element 30 and is pulled by a winch (not shown). A hose 36 is coupled to the valve 32 and communicates with a fluid source such as an air pump (not shown).

Turning now to FIGS. 2 to 5, the operation of the installation assembly 20 during installation of a liner within a pipeline will be described. Initially, the double bladder assembly 22 is inserted into a cylindrical tubular liner L that has been impregnated with epoxy. The liner L may be impregnated with epoxy either before or after the double bladder assembly 22 has been inserted into the liner L. The process of impregnating the liner L with epoxy is commonly referred to as "wetting".

After the liner L has been wetted and with the double bladder assembly 22 inserted therein, the winch is operated so that the liner L and double bladder assembly 22 are pulled into the pipeline P to be repaired and/or reinforced via the winch cable 34, as shown in FIG. 2. Once the liner L and double bladder assembly 22 are at the desired location within the pipeline P, the air pump is operated to supply air to the hose 36. Air fed to the hose 36 passes through the valve 32 and enters the internal reservoir 26a of the inner bladder 26 thereby to inflate the inner bladder 26. The inner bladder 26 is inflated until the double bladder assembly 22 expands to the point where the liner L firmly contacts the interior surface of the pipeline P as shown in FIG. 3. The double bladder assembly 22 is then maintained in this condition for a time period sufficient to enable the liner L to cure.

Following curing of the liner L, the air pump is operated to evacuate air from the internal reservoir 26a of the inner bladder 26 via the valve 32 and hose 36. As the inner bladder 26 shrinks during evacuation of the internal reservoir 26a, the outer bladder 28 remains adhered to the liner L, as shown in FIG. 4.

Once the inner bladder 26 has been deflated, the double bladder assembly 22 is retrieved from the pipeline P. During retrieval of the double bladder assembly 22, the hose 36 is used to pull the inner bladder 26 back out of the pipeline P. As the inner bladder 26 moves, the outer bladder 28 inverts about inversion element 30 and peels away from the liner L, as shown in FIG. 5. This process is continued until the outer bladder 28 has completely separated from the liner L and the inner bladder 26 and inverted outer bladder 28 are removed from the pipeline P.

Although the installation assembly 20 has been shown installing a liner L into a pipeline P that has a constant diameter, the installation assembly 20 can also be used to install a liner into a pipeline having a variable diameter. In this case, it is preferred to use a liner particularly adapted for use at junctures between pipelines of differing diameters.

Figure 6:
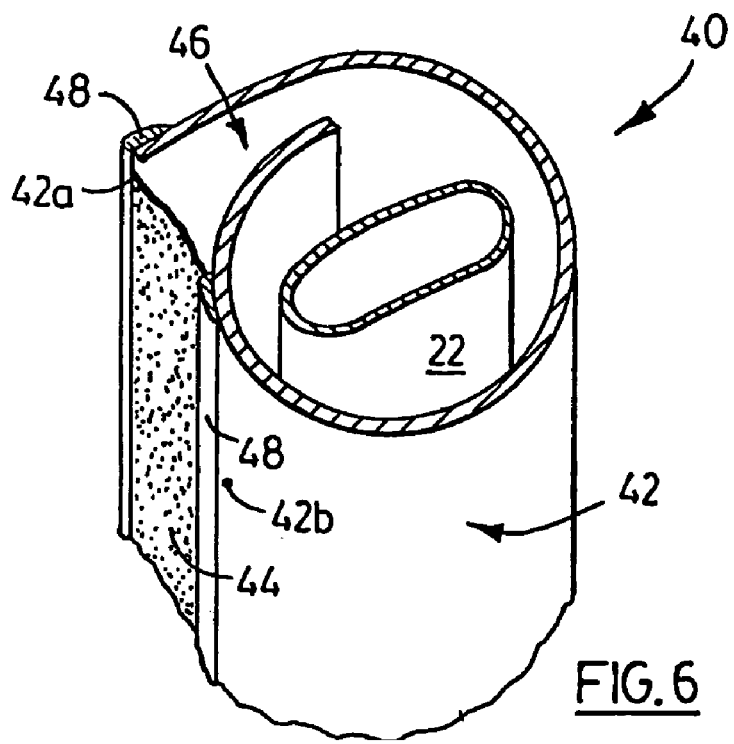
FIG. 6 is a perspective view of a portion of a liner for installation in a variable diameter pipeline in accordance with the present invention.

Turning now to FIG. 6, a pipeline liner for installation in a variable diameter pipeline is shown and is generally identified by reference numeral 40. As can be seen, the variable diameter pipeline liner 40 includes a generally rectangular piece of flexible material, such as felt, that is rolled up to take the form of a tube 42 with the ends of the material overlapping. A web 44 formed of flexible material runs the length of the tube 42 and extends between the outer edge 42a of the tube 42 and the main web 42b of the tube to trap an overlapping portion of material 46 within the tube and define on expandable joint. The ends of the web 44 are secured to the tube 42 by strips of felt 48 fused to the side edges of the web 44.

Figure 7:
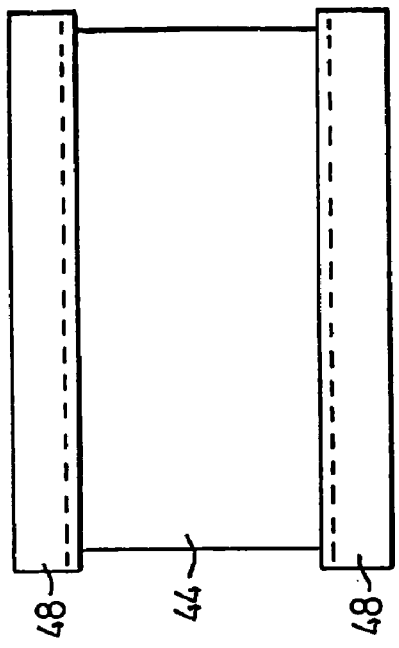
FIG. 7 is a top view of a piece of flexible material forming a tubular portion of the liner of FIG. 6.
Figure 8:
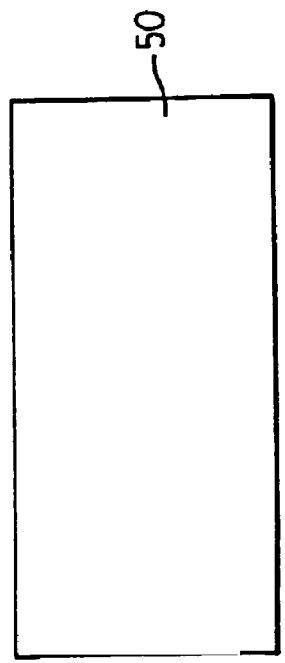
FIG. 8 is a top view of a web and strips of felt forming part of the liner of FIG. 6.
Figure 9:
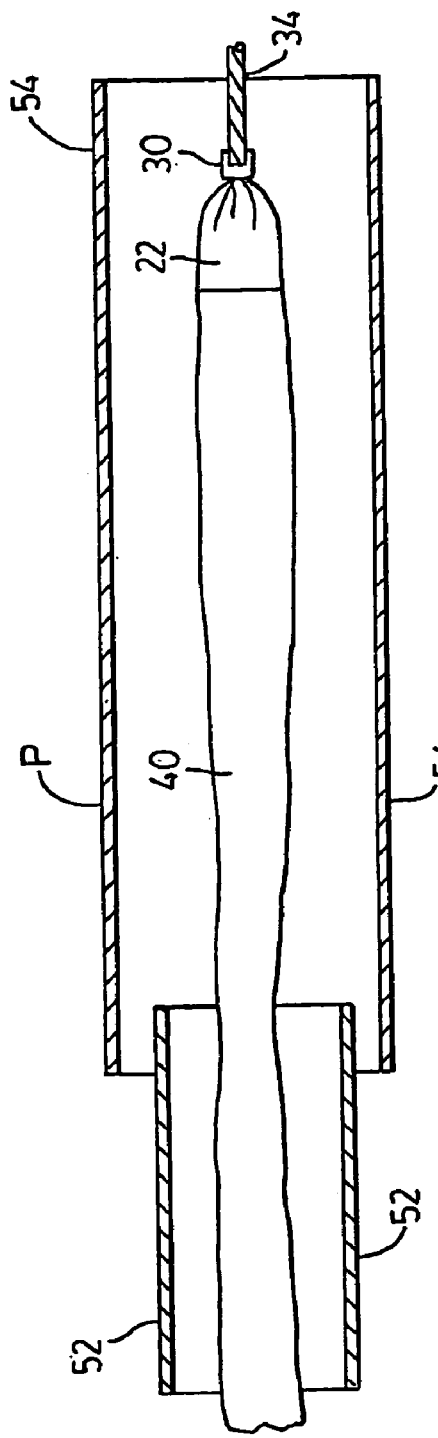
FIG. 9 is a side elevational view, partly in section, of the liner of FIG. 6 being installed in a variable diameter pipeline using the installation assembly of FIG. 1.

During formation of the liner 40, a flat stock of material is cut to yield a rectangular piece of material 50 that can be rolled into a tube having a diameter suitable for use in the variable diameter pipeline to be repaired and/or reinforced, as shown in FIG. 7. The web 44 having the strips of felt 48 fused to its side edges is also formed as shown in FIG. 8. Following this, the piece of rectangular material 50 is rolled into a tube and the strips of felt 48 are fused to the tube 42 to complete the liner 40 as shown in FIG. 6. For example, for a pipeline having a transition from a 4 inch diameter to a 6 inch diameter, the rectangular piece of material 50 is rolled up to form a tube 42 having an inner diameter of 3.5 inches. A 3 inch wide piece of expandable material is used as the web 44. Strips of felt 48, each having a width of about ¾ inches are used to secure the web 44 to the tube 42.

Turning now to FIGS. 9 to 13, installation of the liner 40 into a variable diameter pipeline will be described. With the liner 40 formed in the manner described above, the liner 40 is prepared for installation by inserting the double bladder assembly 22 into the tube 42 and wetting the liner L. The liner 40 is then inserted into the variable diameter pipeline P and is pulled via the winch cable 34 until the liner 40 is positioned at the junction between pipes 52 and 54 of different diameters, such as for example a 4 inch to 6 inch transition.

With the liner 40 correctly positioned within the pipeline P, the inner bladder 26 of the double bladder assembly 22 is inflated in the manner described previously. As the inner bladder 26 inflates, the double bladder assembly 22 expands the liner 40 and forces the liner 40 into contact with the interior surfaces of both pipes 52 and 54. The web 44 of the liner 40 accommodates the different expansion diameters of opposite ends of the liner 40 allowing the liner to form a smooth transition between the different diameter pipes 52 and 54.

Figure 11:
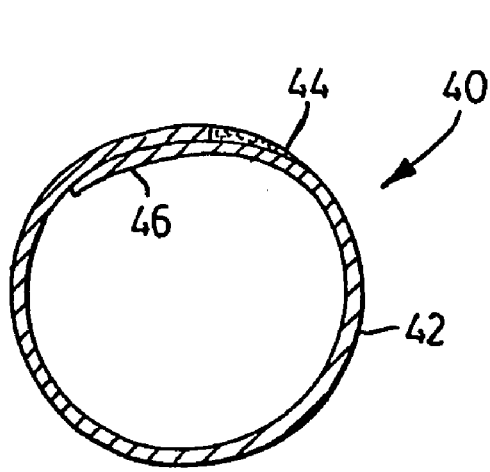
FIG. 11 is a cross-sectional view of a portion of the liner of FIG. 6 expanded within a smaller diameter portion of a variable diameter pipeline.
Figure 12:
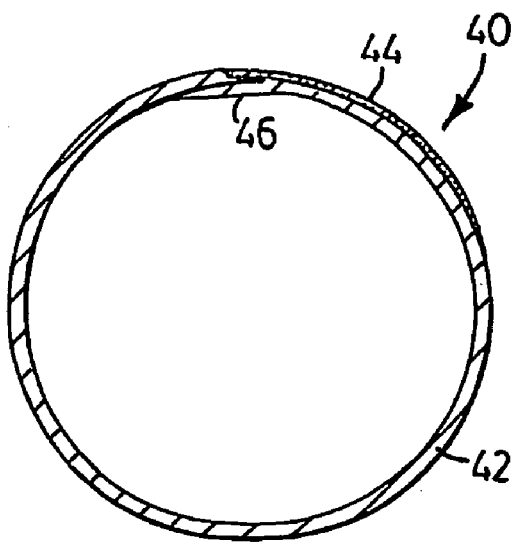
FIG. 12 is a cross-sectional view of another portion of the liner of FIG. 6 expanded within a larger diameter portion of a variable diameter pipeline.

During expansion of the liner 40, the portion of the liner tube 42 within the smaller diameter pipe 52 does not fully expand as shown in FIG. 11. As a result, a significant amount of the overlapping portion 46 remains trapped in the tube 42 and overlaps with the interior surface of the main web 42b. The portion of the liner tube 42 within the larger diameter pipe 54 however, fully expands as shown in FIG. 12. In this fully expanded condition, the overlapping portion 46 still overlaps with a small portion of the interior surface of the main web 42b. In this manner, the overlapping portion 46 always extends across the web 44 so that the thickness of the liner 40 at the location of the web 44 is not compromised. Thus, the liner 40 has at least a minimum thickness corresponding to the thickness of the flexible material 50, about its entire circumference.

With the liner 40 expanded within the pipeline P, the liner 40 is allowed to cure. Since the entire liner 40 is soaked with epoxy, the overlapping portion 46 adheres to the interior surface of main web 42b. Once the liner 40 has cured, the inner bladder 26 is deflated and the double bladder assembly 22 is retrieved from the pipeline P in the manner previously described as shown in FIG. 13.

Although the installation of the liner 40 within the variable diameter pipeline has been described with reference to the installation assembly 20 shown in FIGS. 1 to 5, those of skill in the art will appreciate that the liner 40 may be installed in variable diameter pipelines using other methods and installation assemblies.

Figure 14:
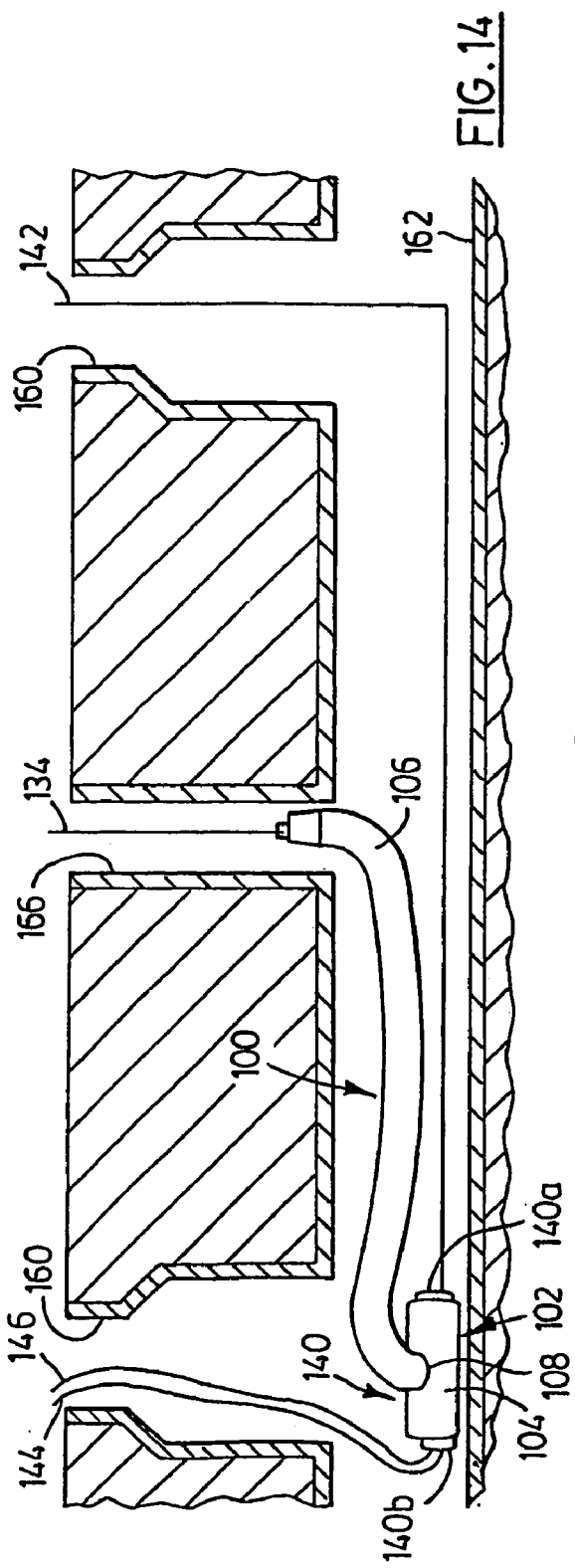
FIG. 14 is a side elevational view, partly in section, of an alternative embodiment of an installation assembly for installing a liner at a T-junction within a pipeline in accordance with the present invention.
Figure 15:
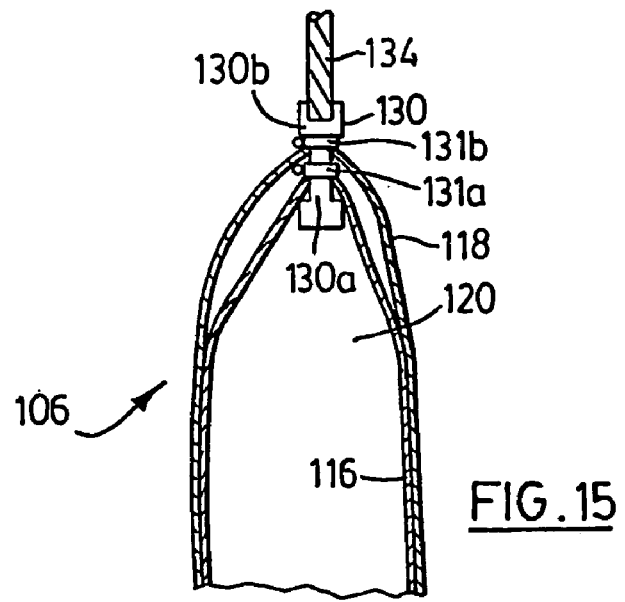
FIG. 15 is a sectional view of a portion of the installation assembly of FIG. 14.
Figure 16:
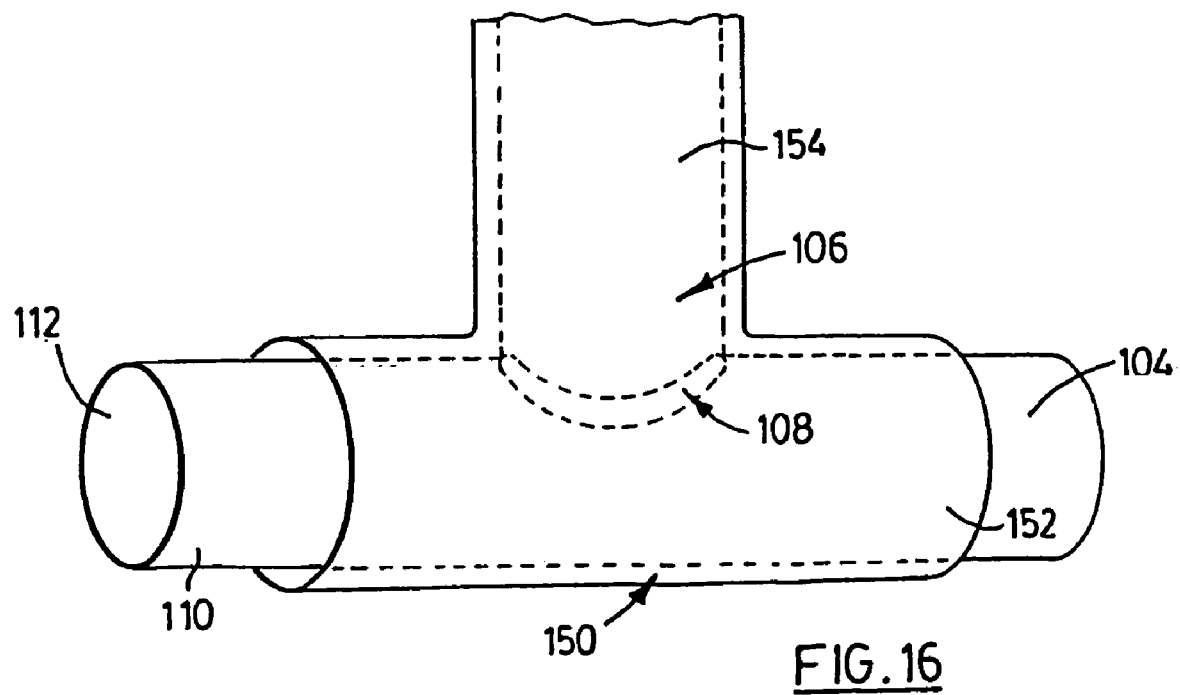
FIG. 16 is a perspective view of another portion of the installation assembly of FIG. 14 with the installation system carrying a liner.
Figure 18:
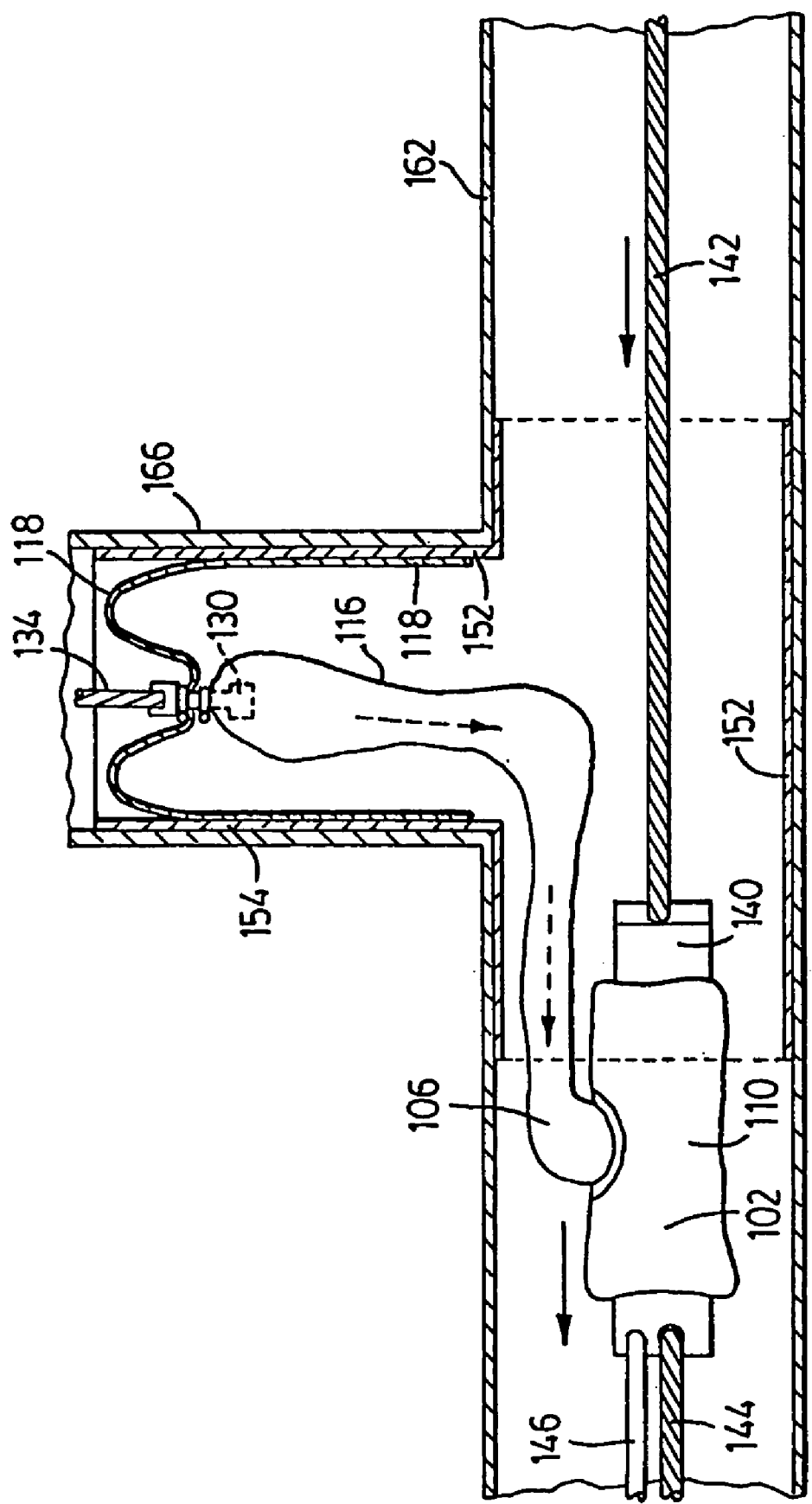
FIG. 18 is a side sectional view of the installation assembly of FIG. 14 during retrieval from a pipeline.

Turning now to FIGS. 14 to 16, an alternative embodiment of an installation assembly for installing a liner at a T-junction within a pipeline in accordance with the present invention is shown and is generally identified by reference numeral 100. As can be seen, the installation assembly 100 includes a T-shaped bladder assembly 102 having a main portion 104 and a lateral portion 106 connected by a fused T-joint 108.

The main portion 104 of bladder assembly 102 includes a single bladder 110 defining an internal reservoir 112. The lateral portion 106 of the bladder assembly 102 includes inner and outer bladders 116 and 118 respectively. The inner bladder 116 also defines an internal reservoir 120 that is in fluid communication with the internal reservoir 112. The outer bladder 118 is in the form of a sleeve and surrounds the inner bladder 116 partially along its length.

An inversion element 130 similar to that described with reference to FIGS. 1 to 5 is partially received by the distal ends of the inner and outer bladders 116 and 118 respectively. The distal ends of the inner and outer bladders 116 and 118 are secured to the bight 130a of the inversion element by clamps 131a and 131b respectively. An installation cable 134 is coupled to the exterior block 130b of the inversion element 130 and extends to a winch (not shown).

A transportation device or carrier 140 extends through the bladder 110. The bladder 110 is sealed to the carrier 140 to allow the bladder 110 to be inflated. An installation cable 142 is attached to the leading end 140a of the carrier 140 and extends to a winch (not shown). A retrieval cable 144 is attached to the trailing end 140b of the carrier 140 and extends to a winch (not shown). A hose 146 having one end coupled to a fluid source such as an air pump (not shown) extends through the carrier 140 and is in fluid communication with the internal reservoir 112 of the bladder 110 via a valve (not shown).

Turning now to FIGS. 14 to 18, installation of a liner 150 into a pipeline having a T-junction using the installation assembly 100 will be described. As can be seen in FIG. 16, the liner 150 is generally T-shaped and includes a main portion 162 and a lateral portion 154. Similar to the previous embodiments, the liner 150 is firstly prepared for installation by inserting the bladder assembly 102 into the liner 150 and wetting the liner 150. During insertion, the main portion 104 of the bladder assembly 102 is pulled through the main portion 152 of the liner 150 and the lateral portion 106 of the bladder assembly 102 is pulled through the lateral portion 154 of the liner 150.

Figure 17:
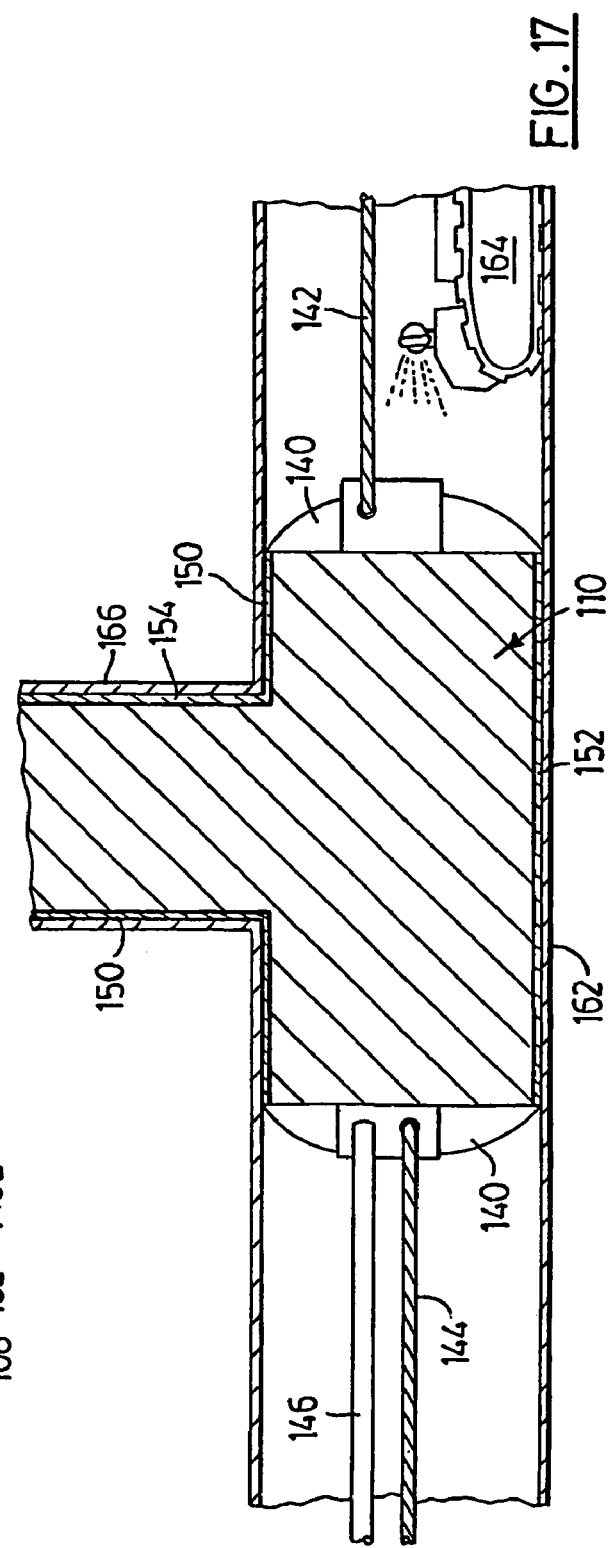
FIG. 17 is a side sectional view of a portion of the installation assembly of FIG. 14 during installation of a liner at a pipeline T-junction.

With the liner 150 prepared for installation, the bladder assembly 102 is launched through a manhole 160 and into a main pipe 162. A remote controlled camera 164 is also placed in the main pipe 162. The installation cable 134, which has been previously fed through a lateral pipe 166 that is connected to the main pipe 162 to define the T-junction to be repaired and/or reinforced, is then used to pull the lateral portion 104 of the bladder assembly 102 into the main pipe 162. Once the full length of the lateral portion 104 of the bladder assembly 102 is in the main pipe 162, the installation cables 142 and 134 are pulled simultaneously. Pulling of the installation cable 142 advances the carrier 140 and hence bladder assembly 102 towards the T-junction defined by the main and lateral pipes 162 and 166 respectively. Pulling of the installation cable 134 advances the lateral portion 106 of the bladder assembly 102 up into the lateral pipe 166. During this stage, the remote controlled camera 164 is used by technicians to assist in the proper positioning of the liner 150 at the T-junction as shown in FIG. 17.

With the liner 150 properly positioned at the T-junction, the air pump is operated to feed air into the hose 146. Air fed into the hose 146 enters the internal reservoir 112 of the bladder 110. Since the bladders 110 and 116 are in fluid communication, air entering the internal reservoir 112 also enters the internal reservoir 120. Air is fed to the bladder assembly 102 until both bladders 110 and 116 are fully inflated so that the liner 150 is expanded and forced into contact with the interior surfaces of the main and lateral pipes 162 and 166 as shown in FIG. 17. As in the previous embodiments, the bladder assembly 102 is maintained in this condition until the liner 150 cures.

Following curing of the liner 150, the air pump is operated to evacuate air from the internal reservoirs 112 and 120 of the bladders allowing the bladders 110 and 116 to deflate. The outer bladder 118 however remains adhered to the liner 150. When the bladders 110 and 116 have been deflated, the retrieval cable 144 is pulled to remove the bladder assembly 102 from the liner 150. During removal of the bladder assembly 102, as the carrier 140 and bladder 110 are pulled out from the main portion 152 of the liner 150, the inner bladder 116 is pulled out of the lateral portion 154 of the liner 150. As this occurs, the outer bladder 118 inverts about the inversion element 130 and is pulled from the liner 150. With the outer bladder 118 separated from the liner 150, the retrieval cable 144 is pulled until the bladder assembly 102 is removed from the pipeline via the manhole 160.

Although the installation system 100 is shown for use in installing a liner at a T-junction between a lateral pipe and a main pipe, those of skill in the art will appreciate that the installation system can be used to install liners in other types of pipe junctions.

Also, although preferred embodiments of the present invention have been described, those of skill in the art will appreciate that variations and modifications may be made without departing from the spirit and scope thereof as defined by the appended claims.

What is claimed is:

1. An installation assembly for installing a liner in a pipeline, said installation assembly comprising:

an inflatable inner bladder having an installation end and a retrieval end and defining an internal reservoir; and an outer bladder surrounding said inner bladder at least along a portion of the length thereof, said outer bladder having an end coupled to said inner bladder adjacent said installation end;

a fluid passage coupled to said inner bladder, said fluid passage for introducing fluid into said internal reservoir to inflate said inner bladder and expand a liner generally surrounding at least a portion of said outer bladder so that said liner can be brought into firm contact with an interior surface of said pipeline; and a retrieval line for removing said inner and outer bladders from said pipeline, said retrieval line being coupled to the retrieval end of said inner bladder so that when said inner and outer bladders are removed from said liner with said inner bladder deflated, said outer bladder separates from said liner and inverts.

2. An installation assembly according to claim 1 further comprising an inversion element received by said inner bladder and said outer bladder adjacent said installation end, said inner and outer bladders being coupled to a portion of said inversion element.

3. An installation assembly according to claim 2 further comprising an installation cable coupled to said inversion element, said installation cable being used to pull said inner and outer bladders to a desired location within said pipeline.

4. An installation assembly according to claim 3 wherein said inversion element is in the form of an I-section having a pair of blocks joined by a bight, said inner and outer bladders being clamped to said bight, said installation cable being coupled to one of said blocks.

5. An installation assembly according to claim 1 wherein said outer bladder extends generally the entire length of said inner bladder.

6. An installation assembly according to claim 1 wherein said fluid passage is a hose coupled to the retrieval end of said inner bladder, said hose constituting said retrieval line.

7. An installation assembly according to claim 6 further comprising an air pump coupled to said hose to inflate and evacuate said inner bladder.

8. A bladder assembly for installing a liner within a pipeline comprising:
an elongate bladder defining an internal reservoir and having a leading end and a trailing end;
a valve element coupled to said elongate bladder to permit the ingress and degress of fluid into said bladder thereby to inflate and deflate said bladder; and
a sleeve generally surrounding said bladder, said sleeve being coupled to said bladder adjacent said leading end.

9. A bladder assembly according to claim 8 wherein said sleeve and bladder are clamped together.

10. A bladder assembly according to claim 9 wherein said valve element is coupled to said bladder at said trailing end.

11. A bladder assembly according to claim 10 further comprising a hitch for a cable.

12. A method of installing a liner in a pipeline comprising the steps of:
positioning a bladder assembly carrying a wetted liner in said pipeline at a desired location, said bladder assembly including an inner bladder having an installation end and a retrieval end and an outer bladder surrounding at least a portion of said inner bladder and contacting an inner surface of said liner, said outer bladder having one end coupled to said inner bladder adjacent said installation end and an opposite free end;
introducing fluid into said inner bladder to inflate said inner bladder so that said bladder assembly expands to bring said liner into firm contact with an interior surface of said pipeline at said desired location;
maintaining said bladder assembly in an inflated condition for a time period sufficient for said liner to cure;
deflating said inner bladder; and
retrieving said bladder assembly from said pipeline by pulling said bladder assembly via said inner bladder so that when said inner bladder moves out of said liner, said outer bladder separates from said liner and inverts.

13. The method of claim 12 further comprising the steps of providing an inversion element adjacent said installation end to which said inner bladder and outer bladder are clamped and using said inversion element as a hitch to pull said bladder assembly into position.

14. The method of claim 13 wherein said fluid is introduced into said inner bladder via a hose and wherein said hose is used to retrieve said bladder assembly.

15. An installation assembly for installing a liner at a junction between a main pipe and a lateral pipe, said installation assembly comprising:
an inflatable bladder assembly for carrying a liner, said bladder assembly including a main portion comprising a single bladder mounted on a carrier and a lateral portion comprising an inner bladder and an outer bladder, said outer bladder extending at least along a portion of the length of said inner bladder, said outer bladder and inner bladder being coupled adjacent a distal end of said lateral portion; and
a fluid passage coupled to said bladder assembly to introduce fluid therein and inflate the main and lateral portions of said bladder assembly thereby to expand said liner so that when said lateral portion extends into said lateral pipe and said main portion is in said main pipe, said liner is brought into contact with the interior of said main and lateral pipes and conforms to the shape of said junction.

16. An installation assembly according to claim 15 further comprising an inversion element received by said inner bladder and said outer bladder adjacent said distal end, said inner and outer bladders being coupled to a portion of said inversion element.

17. An installation assembly according to claim 16 further comprising a first installation cable coupled to said inversion element external to said lateral portion, said first installation cable being used to pull said lateral portion into said lateral pipe.

18. An installation assembly according to claim 17 wherein said inversion element is in the form of an I-section having a pair of blocks joined by a bight, said inner and outer bladders being clamped to said bight, said installation cable being coupled to one of said blocks.

19. An installation assembly according to claim 17 wherein said carrier extends through said main portion, said installation system further comprising a second installation cable coupled to a leading edge of said carrier and a retrieval cable coupled to a trailing edge of said carrier.

20. An installation assembly according to claim 15 wherein said outer bladder extends partially along the length of said inner bladder.

21. An installation assembly according to claim 15 wherein said fluid passage is a hose having one end received by said carrier and being in fluid communication with said single bladder.

22. An installation assembly according to claim 21 further comprising an air pump coupled to another end of said hose.

* * * * *